May 6, 1958  O. R. BRINEY, JR., ET AL  2,833,169
COUPLING STRUCTURE
Filed Aug. 6, 1956
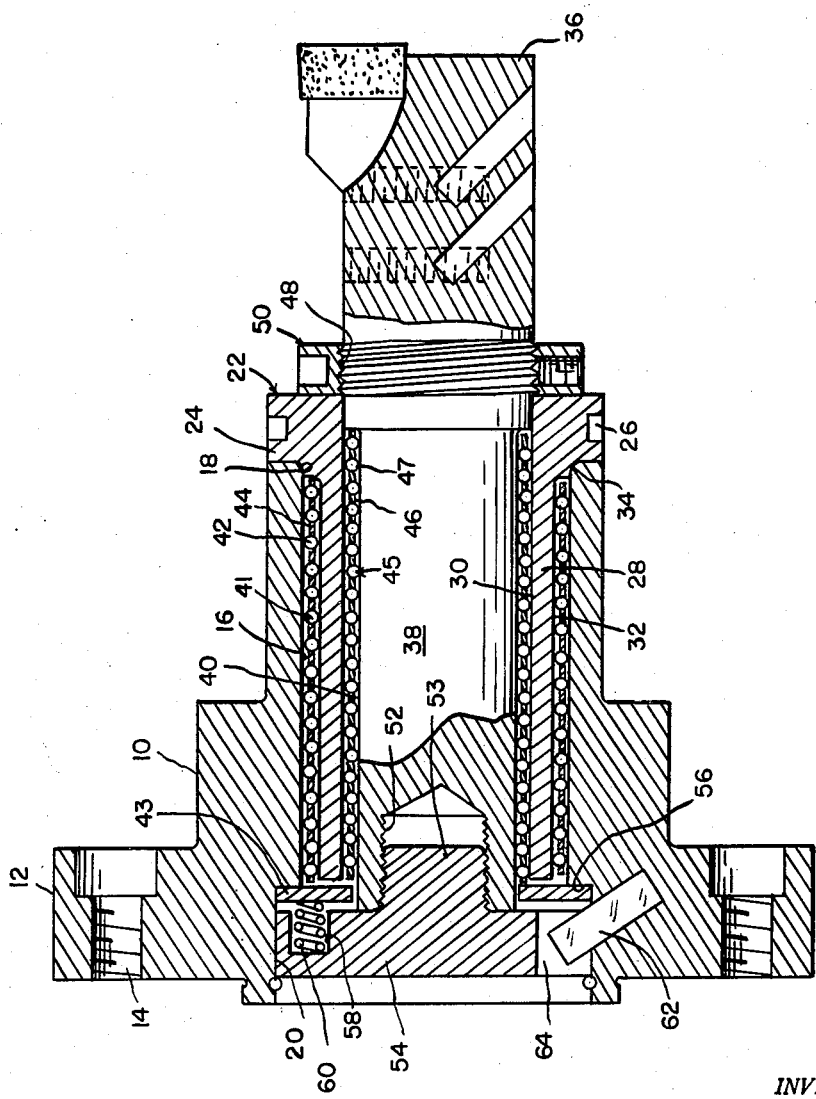
INVENTORS
OTTIS R. BRINEY JR.
JAMES W. BRINEY
BY
ATTORNEYS

United States Patent Office 2,833,169
Patented May 6, 1958

2,833,169

COUPLING STRUCTURE

Ottis R. Briney, Jr., and James W. Briney, Pontiac, Mich., assignors to Briney Manufacturing Co., Pontiac, Mich., a corporation of Michigan Application August 6, 1956, Serial No. 602,374

3 Claims. (Cl. 77—58)

The present invention relates generally to an adjustable coupling structure, and more particularly, to the application of such structure to tool mechanism such as a boring bar.

It is an object of the present invention to provide coupling structure operable to provide for independent axial and radial adjustment between coupled members.

It is a further object of the present invention to provide coupling structure for effecting axial adjustment between a pair of coupled members.

More specifically, it is an object of the present invention to provide for independent extremely accurate adjustment between coupled members while preserving throughout adjustment substantial rigidity so that the necessity for clamping and unclamping associated members in connection with effecting adjustment is eliminated.

More specifically, it is an object of the present invention to provide a tool such for example as a boring bar in which the boring bar may be adjusted axially and radially while mounted for use without the necessity of releasing or unclamping associated elements.

It is a feature of the present invention to provide coupling structure comprising an outer housing member having an elongated cylindrical opening extending into said member, a generally tubular sleeve having an elongated portion received in said opening, said portion having cylindrical internal and external bearing surfaces which are eccentric with respect to each other, and an inner member having an elongated cylindrical portion received within the elongated portion of said sleeve, preloaded elongated ball bearings between the bearing surfaces of said sleeve, said opening, and the cylindrical portion of said inner member, an axially adjustable abutment on said inner member engageable with the outer end of said sleeve, means on said sleeve engageable with the outer member adjacent said opening, and resilient means interconnecting said inner and outer members and urging said inner member inwardly of said opening to maintain said abutment against the end of said sleeve and to maintain said sleeve in engagement with said outer member adjacent said opening.

Other objects and features of the invention will become apparent as the description proceeds, especially when taken in conjunction with the accompanying drawing, wherein:

The figure is an axial sectional view through the coupling structure.

While the coupling structure has utility in different fields, it is illustrated herein as applied to a boring bar to provide for axial and radial adjustment of a boring bar relative to its mounting. In the figure the outer housing member 10 is provided with a radial flange 12 having bolt receiving openings 14 therethrough for attachment to the end of a driving spindle. The housing 10 has an accurately finished internal cylindrical bearing surface 16 terminating at one end in a low angled conical locating surface 18. At the other end of the cylindrical surface 16 the housing 10 is provided with an enlarged cylindrical recess 20 extending radially outwardly beyond surface 16 and opening at the inner end of the housing.

Associated with the housing 10 is a sleeve member indicated generally at 22 having a radially extending head 24 provided with turning means such for example as recesses 25 for engagement with a suitably formed wrench. The sleeve 22 includes an elongated tubular portion 28 having an accurately finished cylindrical internal bearing surface 30 and an accurately finished cylindrical external bearing surface 32 which is slightly eccentric with respect to the bearing surface 30. The sleeve 22 is provided with a conical locating surface 34 engageable with the conical surface 18 of the housing.

The boring bar indicated generally at 36, has an elongated portion 38 received within the sleeve 22 and having an external cylindrical bearing surface 40.

Intermediate the outer bearing surface 32 of the sleeve and the internal cylindrical bearing surface 16 of the housing is an elongated ball bearing indicated generally at 41 and comprising small balls 42 mounted in a retainer 44. Intermediate the internal bearing surface 30 of the sleeve and the cylindrical bearing surface 40 of the bar is a similar ball bearing, indicated generally at 45, also composed of a perforated bearing retainer 46 having openings receiving the small balls illustrated at 47 in the figure. The aforementioned bearing surfaces are accurately finished to exact dimension such that upon insertion the balls are preloaded, thus providing sufficient rigidity in the mounting of the boring bar for its intended use. For example, the dimensions of the balls relative to the clearance provided may be such as to result in nominal interference for each ball of between .0001 and .0004 inch.

The inner member of boring bar 36 has a threaded portion indicated at 48 receiving an adjustable abutment 50 which is illustrated in the form of a nut or collar engageable with the head 24 of the sleeve 22.

The end surface of the head 24 of the sleeve 22 is a flat abutment surface normal to the axis of the sleeve and the engaging surface of the nut or collar 50 is a corresponding flat surface. Accordingly, in all positions of axial adjustment of the boring bar, full surface to surface contact between the collar 50 and the engaged surface at the end of the sleeve 22 is provided, thus preventing any tendency to deflect the boring bar in its supporting bearing 45.

At its inner end the cylindrical portion 38 of the boring bar is recessed and tapped as indicated at 52 for the reception of a threaded portion 53 of a head 54 extending radially into the recess 20 at the inner end of the housing 10. An annular seat 56 is provided at the bottom of the recess 20 to accept washer 43 and to form an annular spring seat. The radially extending portion of the head 54 is provided with a plurality of spring pockets 58 receiving compression springs 60.

A key 62 extends between the outer member or housing 10 and the head 54. As shown, the key is seated in a recess in the housing and has a portion extending into a slot 64 provided in the head 54. The key permits limited axial movement of the boring bar while preventing rotation between the housing 10 and the boring bar. In use the key therefore transmits torque to the boring bar. The threaded connection between the head 54 and the boring bar 36 may be tightened to prevent unscrewing by any torque encountered in use, and if required, the hand of the threads may be such as to cause torque in use to tighten the connection.

With the parts assembled for use, axial adjustment of the boring bar is accomplished simply by rotation of the nut 50. If the rotation of the nut is in a direction to extend the boring bar, this movement results in additional compression of the springs 60. When the adjustment is terminated, the springs 60 retain the nut 50 firmly against the head 24 of the sleeve. During such adjustment rotation of the boring bar is of course prevented by the key 62. Such adjustment may be made completely independent of radial adjustment and will not in any way disturb the radial setting of the boring bar.

Similarly, radial adjustment of the boring bar may be accomplished at any time without disturbing axial adjustment simply by rotating the sleeve 22. Due to the eccentricity between its inner and outer cylindrical bearing surfaces 30 and 32, this rotation results in radial adjustment of the boring bar with respect to the housing 10. As is well understood, suitable graduations may be provided showing the instantaneous radial adjustment.

Adequate support is afforded to the boring bar throughout the intended range of adjustment both radially and axially by the elongated pre-loaded ball bearings. It will be observed that in use the reaction of the work against the boring bar axially thereof is taken up between the nut 50 and the head 24 of the sleeve. The head 24 of the sleeve bears firmly against the end of the housing 10 and is accurately located therein by virtue of the conical bearing surfaces 18 and 34.

Reaction of the work circumferentially of the boring bar is of course taken up by the driving key 62.

The foregoing arrangement permits extremely accurate adjustment of the boring bar and provides an arrangement in which the adjustment, when once made, is not disturbed by the necessity for tightening up of any associated parts. The springs 60 maintain the parts in assembled relation with sufficient stability to permit the cutting operation to be carried out while at the same time also permitting selective axial and radial adjustment of the boring bar.

The drawing and the foregoing specification constitute a description of the improved coupling structure in such full, clear, concise and exact terms as to enable any person skilled in the art to practice the invention, the scope of which is indicated by the appended claims.

What we claim as our invention is:

1. A boring bar capable of accurate axial and radial adjustment comprising a generally tubular housing having means at its inner end for rigid attachment to a spindle, said housing having an elongated accurately finished internal cylindrical bearing surface, a sleeve having an elongated tubular portion received in said housing for rotation therein comprising accurately finished, internal and external eccentric cylindrical bearing surfaces, said sleeve having a radially enlarged head engageable with the outer end of said housing, the outer end of said head providing a flat annular abutment surface, a boring bar having an elongated cylindrical end portion received in said sleeve, an adjustable annular abutment threaded on said bar and having a flat annular abutment surface engaged with flat annular abutment surface on the outer end of the radially enlarged head on said sleeve, the tubular portion of said sleeve being spaced radially from the bearing surface of said housing and the cylindrical end portion of said bar, elongated pre-loaded ball bearings between said sleeve, the bearing surface of said housing and the cylindrical end portion of said bar, a key connecting said housing and bar to drive said bar, and resilient means operating between said housing and bar to position the head of said sleeve against the outer end of said housing and to position said annular abutment against the head of said sleeve.

2. A boring bar as defined in claim 1 in which the outer end of said housing and said sleeve have cooperating conical locating surfaces.

3. Coupling structure for effecting axial adjustment between first and second members while preventing angular relative movement therebetween, said first member having a cylindrical recess terminating in a radially enlarged chamber, said second member having a cylindrical portion extending through said recess and having a radially enlarged head in said chamber, pre-loaded balls between the adjacent cylindrical walls of said recess and cylindrical portion, resilient means between said head and the wall of said chamber adjacent said recess urging said second member inwardly of said recess, and adjustable abutment means including an annular collar threaded on said second member and including also flat annular abutment surfaces perpendicular to the axes of said members, said abutment means acting between said members to adjust the extension of said second member from said recess, and key means between members to prevent relative angular movement therebetween about the axis of said recess.

References Cited in the file of this patent

UNITED STATES PATENTS 2,558,815   Briney _____ July 3, 1951